United States Patent [19]

Wheatland

[11] Patent Number: 4,979,603
[45] Date of Patent: Dec. 25, 1990

[54] LOAD SENSING GEARBOX

[75] Inventor: Graham Wheatland, Pointe-Claire, Canada

[73] Assignee: 501 Manaras Auto Doors, Inc., Aurent, Canada

[21] Appl. No.: 365,816

[22] Filed: Jun. 14, 1989

[51] Int. Cl.⁵ ............................................. F16D 71/00
[52] U.S. Cl. ..................................... 192/150; 49/28; 74/425; 318/469; 318/475
[58] Field of Search .............. 192/150; 74/425, 89.14; 318/469, 475; 49/28

[56] References Cited

U.S. PATENT DOCUMENTS

| | | | |
|---|---|---|---|
| 1,479,178 | 1/1924 | Harvey | 192/150 X |
| 1,646,458 | 10/1927 | Pratt | 192/150 |
| 2,317,490 | 4/1943 | Simpson | 192/150 X |
| 2,562,278 | 7/1951 | Kron | 318/475 |
| 2,945,925 | 7/1960 | Gessell | 192/150 X |
| 2,994,756 | 8/1961 | Gessell | 318/475 X |
| 3,067,627 | 12/1962 | Pickles | 74/425 |
| 3,219,902 | 11/1965 | Sibley | 318/469 X |
| 3,633,313 | 1/1972 | Lafontaine | 49/199 |
| 3,851,538 | 12/1974 | Denkowski et al. | 74/425 |
| 4,750,294 | 6/1988 | Lafontaine | 49/28 |

FOREIGN PATENT DOCUMENTS 1079133 4/1960 Fed. Rep. of Germany ...... 192/150

Primary Examiner—Leslie A. Braun
Assistant Examiner—Scott Anchell
Attorney, Agent, or Firm—Samuel Meerkreebs

[57] ABSTRACT

A universal load sensing gearbox integrating a safety mechanism for use, for instance, with motor driven closures, such as garage doors, barriers and gates, includes a housing which encases a worm slidably mounted on an input shaft and adapted for rotation therewith. The input shaft is connected with the motor driving the closure. The worm is engaged with a worm gear which is mounted on an output shaft which is connected with the closure. Dished washers are provided generally around the input shaft at both ends of the worm to urge the worm in a central meshed engagement with the worm gear. A motion transmission device is provided on the worm and is adapted to slide therewith to detect a longitudinal movement thereof and to transmit this movement to an actuating device which is adapted to stop and/or reverse the motor. Therefore, sufficient resistance to the rotation of the output shaft resulting, for example, from the closure encountering an object pressure, causes the worm to be displaced along the input shaft against the dished washers along with the transmission device. A sufficient movement of the transmission device causes the actuating device to trip a limit switch which triggers the stoppage and/or reversing of the motor. The load sensing gearbox is also intended for agricultural applications using reducing gearboxes, for actuating aircraft wing flaps, for conveyer belts, etc.

13 Claims, 3 Drawing Sheets

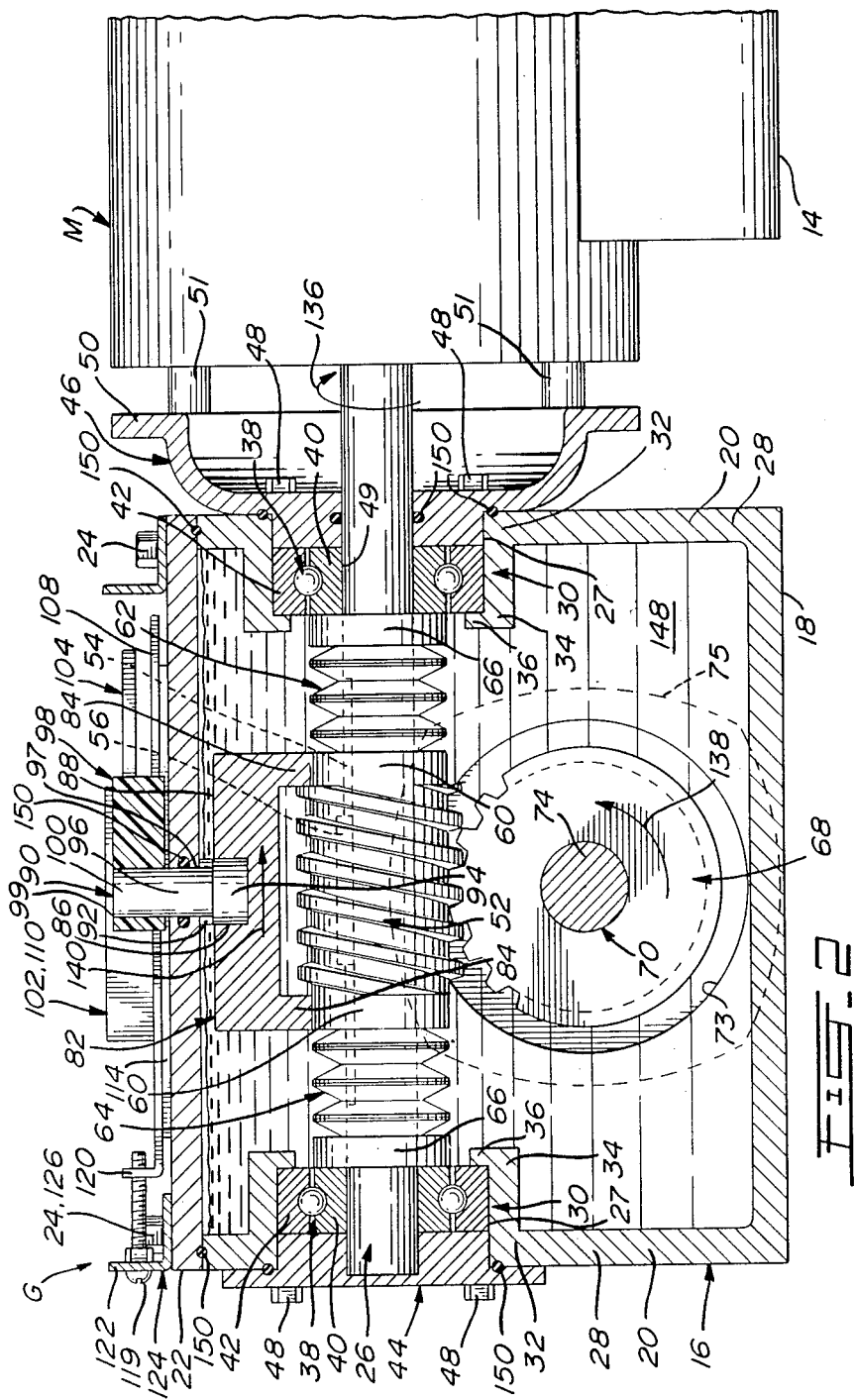

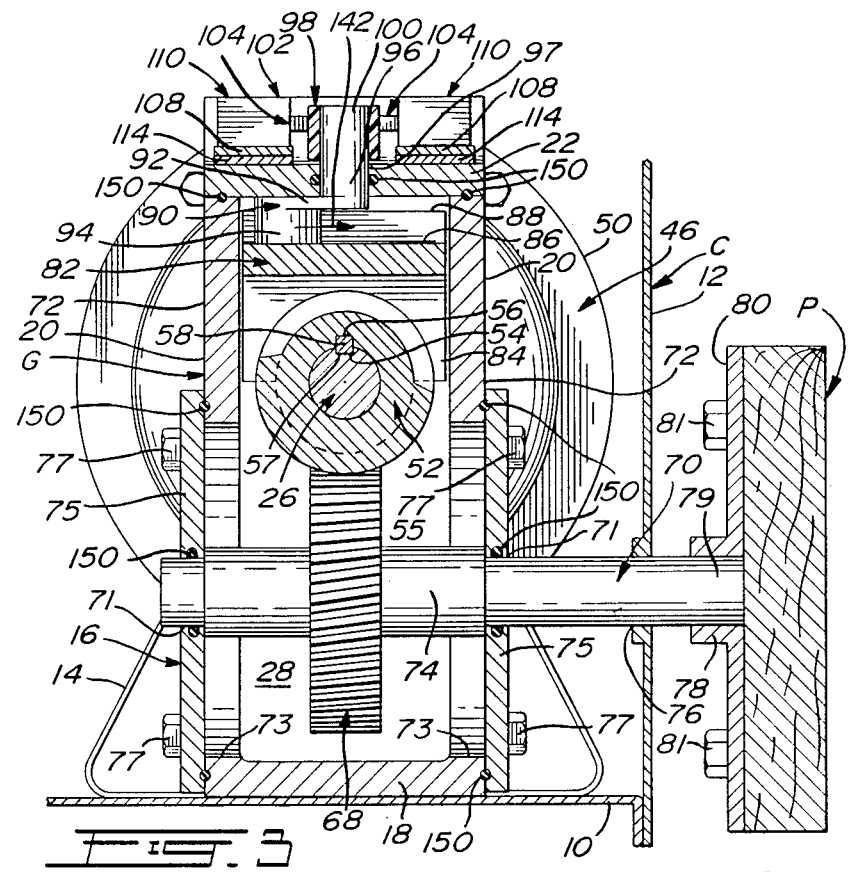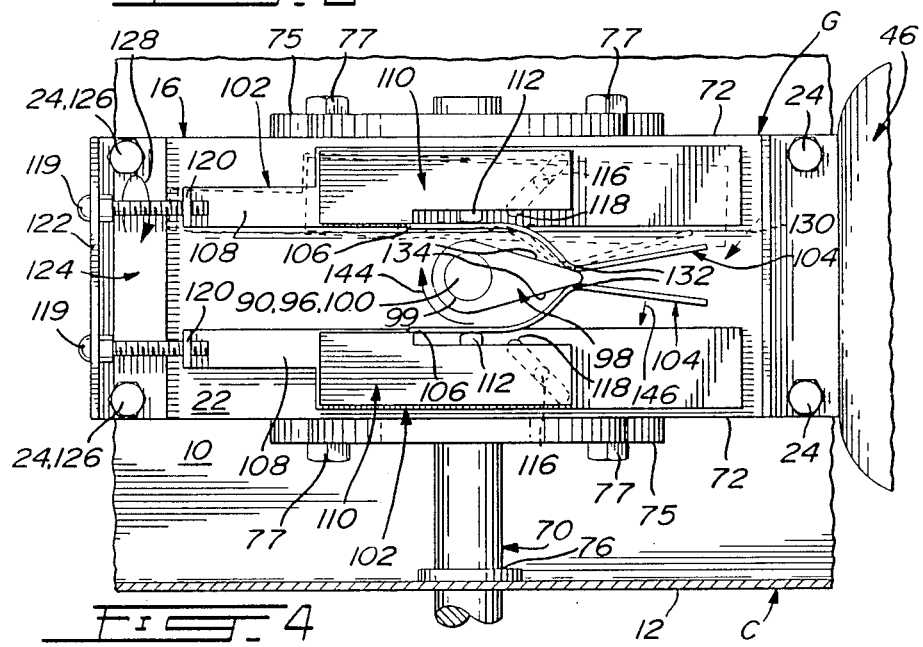

LOAD SENSING GEARBOX

BACKGROUND OF THE INVENTION

1. Field of the Invention

This invention relates to safety mechanisms for various power driven devices and, more particularly, to a universal load sensing gearbox therefor adapted at least to interrupt power thereto. The invention is especially but not exclusively useful for garage doors, gates, barriers and the like.

2. Description of the Prior Art

Safety mechanisms were introduced, for instance, to power driven closures, such as vertical sliding garage doors or pivoting barriers of the type found in parking lots, in order to avoid injury to people or damage to vehicles when these closures are lowered. The same applies for gates which slide horizontally to close for instance, a passageway, in a fence.

Various safety mechanisms have thus been developed, amongst which the most common are safety strips provided along the bottom edge of conventional upward acting overhead-type garage doors. Such safety strips consist of a movable bar which is displaced upon meeting an obstruction so as to trip a switch which is connected to the motor actuating the door.

In other cases, safety mechanisms have been embodied directly onto the shaft of the motor. For example, U.S. Pat. No. 3,633,313, issued to Lafontaine on Jan. 11, 1972, discloses a door operating device including a motor having a worm slidably mounted on its shaft and adapted to therewith. The worm is positioned on the shaft between a pair of bearings or bushings each carrying a limit finger adapted to trip a limit switch upon axial displacement of the worm and therefore of the bushings and limit fingers. The worm is held into its normal position by a pair of compressed springs. The worm meshes with a worm gear which is coupled in some way to a garage door for the raising and lowering thereof. When the garage door encounters an obstruction, the angular speed of the worm gear is reduced. Since the speed of the motor remains the same, the worm slides on the motor shaft and trips one of the limit switches to stop or reverse the motor.

U.S. Pat. No. 4,750,294 which issued on Jan. 14, 1988 also to Lafontaine, is directed to an electrically driven motor shaft and introduces a cage mounted on the motor drive shaft on each side of the worm to slide therewith. Compression springs which are positioned around a further shaft act on the cage and thus on the worm to maintain the latter in its normal central meshed engagement with the worm gear. The cage carries an actuator member which upon axial displacement of the cage along the shaft actuates the associated limit switch.

From the discussion of the above safety mechanisms, it appears that the safety strip is basically only suitable for vertical sliding garage doors. Furthermore, ice can freeze the safety strip thereby preventing the same from actuating the switch adapted to override the operation of the motor when an obstruction is encountered. Moreover, the safety strip and switch arrangement does not differentiate between the actuating thereof when the door is being lowered or when it is being raised. In the first instance, it is desirable that the motor not only stops operating but also reverses in case, for instance, a child is trapped underneath the door. On the other hand, the motor needs only to be stopped when the door is moving upwards.

Both the hereinabove presented Lafontaine patents offer a pair of distinct limit switches which are selectively tripped depending on the direction of rotation of the motor and thus on the direction of the door. Therefore, these switches can be wired differently to the motor in order to produce an appropriate effect thereon depending on the direction of displacement of the closure operated thereby.

However, the positioning of the safety mechanism, that is the worm, the cage structure and the springs, directly on the motor shaft results in a constant load thereon that causes the motor to be substantially rapidly destroyed. This is due to the fact that a motor shaft is not designed to sustain flexion forces.

SUMMARY OF THE INVENTION

It is therefore an aim of the present invention to provide a safety mechanism for power driven devices which can be adapted to various such mechanisms such as force driven closures, conveyer belts, aircraft wing flaps, reducing gearboxes used in agricultural applications, or the like.

It is also an aim of the present invention to provide a safety mechanism comprising a load sensing gearbox which is adaptable to any force driven closure.

It is a further aim of the present invention to provide a load sensing gearbox wherein no load is imposed on the shaft of a motor driving the gearbox.

It is still a further aim of the present invention to provide a load sensing gearbox which is of sealed lubricant construction.

It is still a further aim of the present invention to provide a load sensing gearbox having part of an actuating mechanism thereof located outside of the sealed construction thereof.

It is still a further aim of the present invention to provide a load sensing gearbox wherein the outside part of the actuating mechanism thereof comprises means to easily adjust by hand the sensitivity of the load sensing gearbox.

It is still a further aim of the present invention to provide a gearbox adapted to permit manual operation of the mechanism driven thereby such as by working the gearbox using a crank arm when the motor is disconnected therefrom in order to be replaced or serviced.

A construction in accordance with the present invention includes a load sensing gearbox which comprises a housing means encasing a worm means slidably mounted on an input shaft and adapted for rotation therewith. A worm gear means mounted on an output shaft is engaged with the worm means for rotation therewith. Resilient means are provided at both ends of the worm means to prevent the worm means from sliding freely on the input shaft while maintaining the worm means in substantially central engagement with the worm gear means. A motion detection means is provided in the housing means for transmitting to a motion transmission means a longitudinal displacement of the worm means against one of the resilient means resulting from a sufficient resistance to a rotation of the output shaft. The motion transmission means includes a shaft means which extends through the housing means and which is adapted to rotate upon a longitudinal displacement of the worm means. The shaft means is provided exteriorly of the housing means with an actuator means adapted at least to stop rotation of the input shaft upon a predetermined rotation of the shaft means.

In a more specific construction in accordance with the present invention, the housing means is a sealed metal casing. The input and output shafts extend outwards of the casing.

In a still more specific construction in accordance with the present invention, the worm means is provided at both ends thereof with cylindrical shoulders in the axis of the worm means.

In a still further specific construction in accordance with the present invention, the worm means is keyed on the input shaft.

In a still further specific construction in accordance with the present invention, the resilient means are dished washers mounted on the input shaft in a biased state between each one of the ends of the worm means and a bearing means provided on the input shaft outwards of the worm means. The dished washers are balanced to urge the worm means in a substantially central meshed position with respect to the worm gear.

In a still more specific construction in accordance with the present invention, the motion detection means includes at both ends thereof arms which extend downwards substantially at right angles from the motion detection means. The arms have concave distal ends each adapted to marry or coact with an outer surface of a respective one of the shoulders of the worm means. Means are provided to laterally restrain the motion detection means so that it can only be displaced longitudinally along the input shaft along with the worm means. The motion transmission means includes an eccentric member which comprises a stub and the shaft means joined in an eccentric way by a connecting member to extend parallel and opposite therefrom. The stub is slidably engaged in a channel transversely defined on an upper surface of the motion detection means. The connecting member is sandwiched between a top wall of the casing and the motion detection means so that an upper end of the shaft means extends outwards of the top wall through an opening defined therein. The upper end of the shaft means being connected to the actuator means whereby, the sufficient resistance to the rotation of the output shaft produces a movement of the worm means along the input shaft against respective ones of the dished washers thus resulting in a similar displacement of the motion detection means. The stub is guided in the channel of the motion detection means to cause rotation of the eccentric member about the shaft means thereof.

In a still more specific construction in accordance with the present invention, a motor drives the input shaft and the actuator means comprises an actuating arm connected to the upper end of the shaft means for rotation therewith. The casing is provided on the exterior thereof with at least a pair of limit switches adapted to stop and/or reverse the motor. The actuating arm is adapted to trip upon sufficient rotation thereof the one of the pair of limit switches associated with the direction of rotation of the shaft means.

In a still more specific construction in accordance with the present invention, one of the contacts of each of the limit switches is adapted to be displaced in order to allow adjustment of the sensitivity thereof and thus of the load sensing gearbox.

BRIEF DESCRIPTION OF THE DRAWINGS

Having thus generally described the nature of the invention, reference will now be made to the accompanying drawings, showing by way of illustration a preferred embodiment thereof, and in which:

FIG. 2 is a cross-sectional elevation of the load sensing gearbox;

FIG. 3 is a cross-sectional side view of the load sensing gearbox; and

FIG. 4 is a top plan view partly in cross-section of the load sensing gearbox illustrating a part of an adjustable actuating mechanism thereof located outside the sealed construction of the gearbox.

DESCRIPTION OF THE PREFERRED EMBODIMENTS

Figure 1:
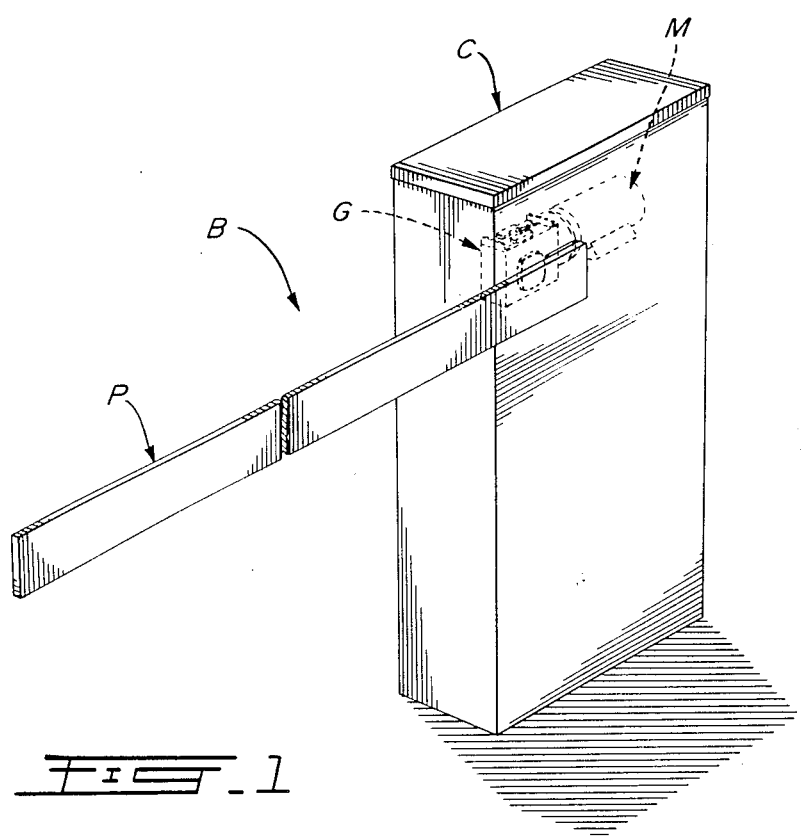
FIG. 1 is a perspective view of a motor operated barrier adapted with a load sensing gearbox according to the invention.

A load sensing gearbox G according to the present invention is embodied, for example, in a barrier B, as generally seen in FIG. 1. The barrier B basically includes a pivoting elongated wooden panel P and a sheet metal casing C which encloses the gearbox G and a motor M (shown in dotted lines in FIG. 1) which operate the panel P.

Now generally referring to FIGS. 2 and 3, the casing C has a support plate 10 which extends horizontally inwards from a peripheral sidewall 12 thereof. The motor M is mounted to the support plate 10 by way of a bracket 14.

The gearbox G comprises a housing 16 having a bottom wall 18, sidewalls 20 which are integral with the bottom wall 18, and a cover 22. The cover 22 is bolted at the periphery thereof to the upper end surfaces of the sidewalls 20 using bolts 24.

The gearbox G includes an input shaft 26 which extends generally through openings 27 defined in opposite lateral sidewalls 28 of the housing 16 and adapted to rotatably support the input shaft 26 in a way described below. Short cylindrical sleeves 30 extend inwards of the lateral sidewalls 28 from parts 32 thereof which define the openings 27 and which are integral with the sleeves 30. The openings 27 are also of use during assembly of the gearbox G. The inner end 34 of each sleeve 30 is provided with a circular flange 36 which extends radially inwards of the sleeve 30.

The input shaft 26 is rotatably mounted to the gearbox G by way of bearings 38. More precisely, the input shaft 26 is threadably mounted to inner parts 40 of the bearings 38 for rotation therewith within outer parts 42 thereof. Covers 44 and 46 which are bolted to the lateral sidewalls 28 by bolts 48 to close off the openings 27 defined therein, are used to compress the outer parts 42 of the bearings 38 against the flange 36 of the sleeves 30 defining the openings 27.

The input shaft 26 extends past the lateral sidewall 28 associated with the cover 46 through a bore 49 defined in the latter so as to be coupled with the motor M. The cover 46 is also provided with a peripheral flange 50 in order to fix the motor M to the gearbox G using bolts (not shown) which extend through spacers 51.

A worm 52 is mounted on the input shaft 26 so as to rotate therewith. This is accomplished by having a channel 54 defined longitudinally on the outer surface of the input shaft 26. The worm 52 has a bore 55 defined longitudinally therethrough and a further channel 56 defined longitudinally on the inner surface of the worm 52 defining the bore 55. The channels 54 and 56 of the input shaft 26 and the worm 52 respectively, face each other to define an elongated opening 57 which slidably receives in a mating relationship a key 58. Therefore, the worm 52 rotates with the input shaft 26 upon actuation of the motor M. Furthermore, the worm 52 can slide on the input shaft 26.

The worm 52 is provided at its ends with shoulders 60 which, by being threadless, have a smooth cylindrical outer surface. Two sets of dished washers or Belleville washers 62 and 64 are provided on the input shaft 26 between the shoulders 60 thereof and flat washers 66 which abut the inner parts 40 of the bearings 38. All these elements, that is the worm 52, the dished washers 62 and 64, the flat washer 66 and the inner part 40 of the bearing 38, all rotate along with the input shaft 26.

The worm 52 meshes with a toothed worm gear 68 which is fixedly mounted on an output shaft 70. The dished washers 62 and 64 are sufficiently compressed to maintain the worm 52 in a central meshing engagement with respect to the worm gear 68. The output shaft 70 extends across longitudinal sidewalls 72 of the housing 16 through bores 71 defined in covers 75 held in place by bolts 77. The covers 75 close large openings 73 defined in the longitudinal sidewalls 72 which are used to position different elements of the gearbox G during assembly thereof. The output shaft 70 comprises an enlarged section 74 which fits between the longitudinal sidewalls 72 to prevent any longitudinal displacement of the output shaft 70.

On the side of the gearbox G closest to the sidewall 12 of the casing C, the output shaft 70 extends through a reinforced opening 76 defined in the sidewall 12 in order to be mounted at a distal end 79 of the output shaft 70 within a sleeve 78 which extends at right angles from a metal plate 80 onto which the panel P is mounted by bolts 81.

Therefore, upon rotation of the motor M, the input shaft 26 and thus the worm 52 rotate to drive the worm gear 68 and the output shaft 70 to produce a rotational displacement of the panel P of the barrier B.

A guide and slide block 82 has arms 84 at the ends thereof which extend downwards therefrom. The arms 84 have concave semicircular recesses defined therein so as to overlie the upper half section of the shoulders 60 of the worm 52. The block 82 is laterally restrained by the longitudinal sidewalls 72 of the housing 16. Therefore, the block 82 does not rotate with the worm 52 but does slide longitudinally therewith.

A channel 86 is transversely defined in the upper surface 88 of the block 82. An eccentric member 90 has a flat portion 92 and a short cylindrical stub 94 which extends downwards from a lower surface of the flat portion 92. The stub 94 is slidably engaged in the channel 86 of the block 82. A cylindrical pin 96 extends upwards from the upper surface of the flat portion 92 of the eccentric member 90 through an opening 97 defined in the cover 22 of the housing 16 of the gearbox G. The stub 94 and the pin 96 are mounted to the flat portion 92 in a parallel and eccentric relationship with respect to one another. The pin 96 is rotatable within the opening 97 defined in the cover 22 of the housing 16.

Now generally referring to FIG. 4, it will be seen that an actuating arm 98 made of a plastic material is fixed through an opening 99 centrally defined therein to a top end 100 of the pin 96. A pair of similar actuating devices 102 are symmetrically positioned on a top exterior part of the cover 22 on each side of the actuating member 98. Both actuating devices 102 being similar, only one will be described hereinbelow.

The actuating device 102 comprises a resilient actuating blade 104 mounted at one end 106 thereof to an adjustment plate 108 onto which a limit switch 110 is also mounted. Therefore, upon sufficient rotation of the pin 96 and thus of the actuating arm 98, the actuating blade 104 pivots about the end 106 thereof and trips the limit switch 110 by depressing a push button 112 thereof.

The sensitivity of the load sensing gearbox G can be appropriately adjusted at the level of the actuating device 102. The adjustment plate 108 is displaceably mounted over a further plate 114 fixedly mounted over the cover 22. A pin 116 extends upwards from the plate 114 and is engaged in a slot 118 diagonally defined in the adjustment plate 108. The adjustment plate is further fixed to the gearbox by way of a screw 119 threadably engaged in a curved end 120 thereof and in a vertical section 122 of a bracket 124 mounted on the cover 22 by way of bolts 126. A clockwise rotation of the screw 119 as shown by arrow 128 causes the adjustment plate 108 to pivot about the pin 116 of the plate 114 in the direction shown by arrow 130. This displaces a contact portion 132 of the actuating blade 104 along a side surface of the actuating arm 98 towards the axis of rotation thereof. Therefore, a lesser rotation of the pin 96 and thus of the actuating arm 98 is required to cause the actuating blade 104 to depress the push button 112 and hence trigger the limit switch 110, which stops and/or reverses the motor M.

The general operation of the load sensing gearbox G follows hereinafter. Upon rotation of the motor M and thus of the input shaft 26 and of the worm 52 in a direction shown by arrow 136 in FIG. 2, the worm gear 68 rotates in a direction shown by arrow 138. Such operation of the motor M means that the panel P is being moved from a raised position to the lowered position thereof shown in FIG. 1. If the panel P encounters an obstruction while being lowered, the motor M will stop and/or reverse depending on the resistance of the obstruction with respect to the sensitivity adjustment of the load sensing gearbox G. If this resistance is sufficient, the load sensing gearbox G will cause the motor M to be stopped and/or reversed, as it is explained hereinafter. As the obstruction reduces the angular speed of the worm gear 68 and as the input shaft 26 which is directly connected to the motor M maintains a constant angular speed, the worm 52 will be forced, as shown by arrow 140, along the input shaft 26 thereby exerting axial pressure against the set of dished washers 62 which will flatten accordingly. The block 82 follows the displacement of the worm 52 causing the stub 94 to slide in the channel 86 of the block 82 as shown by arrow 142 in FIG. 3. The stub 94 will slightly be forced to rotate as it slides within the channel 86. This causes the eccentric member 90 to rotate as a whole about the axis of the pin 96. The rotation of the pin 96 causes a similar rotation of the actuating arm 98 and a pivot of the actuating blade 104 in directions indicated by arrows 144 and 146, respectively. If the displacement of the worm 52 along the input shaft 26 is sufficient, the limit switch 110 will be tripped and trigger the motor M as it was explained hereinbefore.

There is therefore no damage to the object acting as the obstruction, nor to the mechanism due to the overload.

When there is no more obstruction, the compressed or preloaded set of dished washers 62 urges the worm 52 into a normal central meshing engagement with the worm gear 68. Therefore, the block 82, the eccentric member 90, the actuating arm 98 and the actuating blade 104 also return to their normal operating positions.

The gearbox G and, more particularly, the housing 16 thereof is filled with oil 148 to prolong the life thereof. A plurality of seals 150 are thus provided in the housing 16 of the gearbox G to ensure tightness thereof.

The covers 22, 44, 46 and 75 allow for the different elements forming the gearbox G to be easily installed therein during assembly.

From the foregoing, it is easily seen that the load sensing gearbox provides for a safety mechanism which is adaptable to any powered closure. Using the gearbox G, no load is imposed on the motor shaft, thereby prolonging the life of the motor. The switching device being located outside of the gearbox, the gearbox can be filled with oil which also helps to prolong the life of the gearbox. Furthermore, adjustment of the sensitivity of this safety mechanism is facilitated as it is done without opening the housing of the gearbox. Therefore, a same pair of sets of dished washers with a given resiliency mounted in the gearbox can cover a substantial range of critical loads, meaning loads that are substantial enough to cause triggering of the motor. Moreover, the barrier can be manually operated by working a crank in the gearbox when the motor is disconnected therefrom to be serviced or replaced.

As will be realized by one skilled in the art, the load sensing gearbox also can be used for a multitude of other applications such as for motor driven conveyer belts, agricultural devices using reducing gearboxes and for motor actuated aircraft wing flaps. In each case, an obstruction interrupts in some way power to the actuator.

The gearbox can be driven by any mechanical mechanism which is actuated by air, water, hydraulics, electric power, combustion, etc.

I claim:

1. A load sensing gearbox comprising a housing means encasing a worm means slidably mounted on an input shaft and adapted for rotation therewith, a worm gear means being mounted on an output shaft, said worm gear means being engaged with said worm means for rotation therewith, resilient means being provided at both ends of said worm means for maintaining said worm means in substantially central engagement with said worm gear means, motion detection means being provided in said housing means for transmitting to a motion transmission means a longitudinal displacement of said worm means on said input shaft against one of said resilient means resulting from a sufficient resistance to a rotation of said output shaft, said motion transmission means including a shaft means extending through said housing means and adapted to rotate upon a longitudinal displacement of said worm means, said shaft means being provided exteriorly of said housing means with an actuator means adapted at least to stop rotation of said input shaft upon a predetermined rotation of said shaft means.

2. A load sensing gearbox as defined in claim 1, wherein said housing means is a sealed metal casing, said input and output shafts extending outwards of said casing.

3. A load sensing gearbox as defined in claim 2, wherein said casing is substantially filled with oil, seals being provided to ensure a tightness of said casing.

4. A load sensing gearbox as defined in claim 1, wherein said worm gear means is a toothed circular worm gear in meshed engagement with said worm means.

5. A load sensing gearbox as defined in claim 1, wherein said worm means is keyed on said input shaft.

6. A load sensing gearbox as defined in claim 1, wherein said input shaft is provided with a first longitudinal channel on an outer surface thereof, said worm means having a generally circular bore defined longitudinally therethrough, an inner surface of said worm means being provided with a second longitudinal channel facing said first longitudinal channel, a key being received in both said first and second channels, thereby allowing said worm means to slide on said input shaft and to rotate therewith.

7. A load sensing gearbox as defined in claim 1, wherein said resilient means comprise dished washers biasedly mounted on said input shaft between each one of said both ends of said worm means and a bearing means provided on said input shaft outwards of said worm means, said dished washers being balanced for urging said worm means in said substantially central meshed engagement with said worm gear means.

8. A load sensing gearbox as defined in claim 1, wherein said worm means is provided at said both ends thereof with cylindrical shoulders and wherein said motion detection means comprises at both ends thereof arms extending downwards substantially at right angles from said motion detection means, said arms having concave distal ends each coacting with an outer surface of a respective one of said shoulders of said worm means, means being provided for laterally restraining said motion detector, whereby said motion detection means can only be displaced longitudinally along said input shaft along with said worm means, said motion transmission means including an eccentric member comprising a stub and said shaft means joined in an eccentric way by a connecting member to extend parallel and opposite therefrom, said stub being slidably engaged in a channel transversely defined on an upper surface of said motion detection means, said connecting member being sandwiched between a top wall of said housing means and said motion detection means with said shaft means extending through an opening defined in said top wall thereof, an upper end of said shaft means exterior of said housing means being connected to said actuator means, whereby said sufficient resistance to the rotation of said output shaft produces a movement of said worm means along said input shaft against a respective one of said resilient means thereby resulting in a similar displacement of said motion detection means, said stub being guided in said channel to cause rotation of said eccentric member about said shaft means thereof.

9. A load sensing gearbox as defined in claim 8, wherein a motor is provided for driving said input shaft and wherein said actuator means comprises an actuating arm connected to said upper end of said shaft means and extending radially therefrom for rotation therewith, said housing means being provided on the exterior thereof with at least a pair of limit switches adapted to stop and/or reverse the motor, said actuating arm being adapted to trip upon sufficient rotation thereof the one of said pair of limit switches associated with the direction of rotation of said shaft means.

10. A load sensing gearbox as defined in claim 9, wherein each of said limit switches comprises a resilient contact blade adapted to pivot and depress, upon said sufficient rotation of said shaft means, an actuator of said limit switch for appropriately acting on the motor.

11. A load sensing gearbox as defined in claim 1 10, wherein position of said contact blade with respect to said actuating arm is adjustable.

12. A load sensing gearbox as defined in claim 11, wherein said contact blade is mounted to an adjustment plate mounted on said housing means, said adjustment plate being adapted for pivotal adjustment thereof in a plane of rotation of said actuating arm to allow said position of said contact blade with respect to said actuating arm to be set in accordance with a predetermined sensitivity of said load sensing gearbox.

13. A load sensing gearbox as defined in claim 8, wherein said means for laterally restraining said motion detection means comprises sidewalls of said housing means disposed parallel to said input shaft and perpendicularly to said top wall of said housing means, said motion detection means being slidable between said sidewalls.

* * * * *

UNITED STATES PATENT AND TRADEMARK OFFICE
CERTIFICATE OF CORRECTION

PATENT NO. : 4,979,603

DATED : Dec. 25, 1990

INVENTOR(S) : Graham Wheatland

It is certified that error appears in the above-identified patent and that said Letters Patent is hereby corrected as shown below:

In claim 11, line 1, change "1 10" to --10--.

Signed and Sealed this

Thirtieth Day of April, 1991

Attest:

HARRY F. MANBECK, JR.

*Attesting Officer*  *Commissioner of Patents and Trademarks*